No. 790,565.

Patented May 23, 1905.

UNITED STATES PATENT OFFICE.

ARTHUR EICHENGRÜN AND THEODOR BECKER, OF ELBERFELD, GERMANY, ASSIGNORS TO FARBENFABRIKEN OF ELBERFELD CO., OF NEW YORK, N. Y., A CORPORATION OF NEW YORK.

TRIACETYL CELLULOSE.

SPECIFICATION forming part of Letters Patent No. 790,565, dated May 23, 1905.

Application filed January 8, 1902. Serial No. 88,898. (Specimens.)

*To all whom it may concern:*

Be it known that we, ARTHUR EICHENGRÜN and THEODOR BECKER, doctors of philosophy, chemists, residing at Elberfeld, Germany, (assignors to the FARBENFABRIKEN OF ELBERFELD Co., of New York,) have invented a new and useful Improvement in a New Derivative of Cellulose and Process of Making Same; and we hereby declare the following to be a clear and exact description of our invention.

Our invention relates to the production of a new acetylized derivative of cellulose. The process for preparing this new body consists in treating cellulose with a mixture of acetic anhydrid and sulfuric acid at temperatures below 50° centigrade.

In carrying out the new process practically we can proceed as follows, the parts being by weight: Two hundred parts of cellulose are introduced into a mixture of eight hundred parts of acetic anhydrid and twenty parts of concentrated sulfuric acid, and the mixture thus obtained is then diluted with the equal volume of glacial acetic acid or another suitable solvent. The reaction mass is allowed to stand for twelve to twenty-four hours, the temperature rising the while to 40° to 45° centigrade. It is advisable to keep the temperature at a lower degree by cooling. The clear nearly colorless thick liquid thus obtained is then poured into water, by which means the new acetyl cellulose is separated. The new body thus prepared is a whitish voluminous mass and possesses very valuable properties. In a dry state it is readily soluble in chloroform, epichlorhydrin, nitrobenzene, and glacial acetic acid, soluble in acetone and pyridin, and insoluble in alcohol, ether, acetic ether, amyl acetate, and glycerin. It is not attacked by cold alkaline carbonates, ammonia, or dilute acids, and but with great difficulty by caustic alkalies. On evaporating the solutions of the new aceytl cellulose a colorless and translucid film remains, which is, even in a thickness of half a millimeter, very flexible. The concentrated solutions, especially that in glacial acetic acid, have the characteristic property that on being poured into a liquid which does not dissolve the new acetylized cellulose—such as water, alcohol, or formic aldehyde, or the like—they deposit peculiar cylindric precipitates, including a large quantity of the liquid. On drying the said precipitates shrink to hard oblong bodies. The new acetyl cellulose is decomposed on heating it to about 250° centigrade.

By analysis we have found that the new product is a triacetyl derivative of cellulose. The new product differs from the triaceytl cellulose of the old art by its stability against cold alkaline carbonates and ammonia and by the property of being very difficultly attacked by caustic alkalies. The triacetyl cellulose of the old art is easily reacted upon by alkalies, being thus reconverted into cellulose.

Having now described our invention and in what manner the same is to be performed, what we claim as new, and desire to secure by Letters Patent, is—

The herein-described new triacetyl cellulose characterized by its resistance against alkali carbonates, being a whitish voluminous mass readily soluble in chloroform, epichlorhydrin, nitrobenzene and glacial acetic acid, soluble in acetone and pyridin and insoluble in alcohol, ether, acetic ether, amyl acetate and glycerin, being not attacked by the action of cold alkaline carbonates, ammonia or dilute acids, leaving behind colorless translucid, flexible films on evaporating its solutions, being precipitated on pouring the solutions thereof into water and being decomposed, when heated to about 250° centigrade.

In testimony whereof we have signed our names in the presence of two subscribing witnesses.

ARTHUR EICHENGRÜN.
THEODOR BECKER.

Witnesses:
OTTO KÖNIG,
J. A. RITTERSHAUS.